United States Patent
Strauss

(10) Patent No.: US 11,014,249 B1
(45) Date of Patent: May 25, 2021

(54) CASTLE RETENTION MECHANISM WITH TAPERED ANNULAR CHANNEL

(71) Applicant: X Development LLC, Mountain View, CA (US)

(72) Inventor: Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 605 days.

(21) Appl. No.: 15/833,205

(22) Filed: Dec. 6, 2017

(51) Int. Cl.
| | | |
|---|---|---|
| *B25J 15/04* | (2006.01) | |
| *B25J 18/00* | (2006.01) | |
| *F16B 7/04* | (2006.01) | |
| *B25J 13/00* | (2006.01) | |
| *B25J 9/16* | (2006.01) | |

(52) U.S. Cl.
CPC ....... *B25J 15/0475* (2013.01); *B25J 15/0433* (2013.01); *B25J 15/0491* (2013.01); *B25J 18/002* (2013.01); *F16B 7/0426* (2013.01); *B25J 9/16* (2013.01); *B25J 13/00* (2013.01); Y10T 403/7045 (2015.01)

(58) Field of Classification Search
CPC ............... B25J 15/0433; B25J 15/0475; B25J 15/0491; B25J 18/002; F16B 2/245; F16B 7/0426; F16B 7/0486; F16D 1/116; F16L 37/088; F16L 37/0885; Y10T 403/7045
USPC ....................................................... 403/364
See application file for complete search history.

(56) References Cited

U.S. PATENT DOCUMENTS

| | | | | |
|---|---|---|---|---|
| 1,263,252 A | * | 4/1918 | Jencick ................... | F16D 1/076 464/157 |
| 2,553,220 A | * | 5/1951 | Troeger .................. | F16B 21/16 403/364 |
| 2,710,763 A | * | 6/1955 | Gilbert .................... | F02B 67/04 403/364 |
| 2,913,261 A | * | 11/1959 | Matchett ............. | F16L 37/0885 285/148.19 |
| 3,689,113 A | * | 9/1972 | Blaschke ................ | E02D 5/523 285/90 |

(Continued)

FOREIGN PATENT DOCUMENTS

| | | | | |
|---|---|---|---|---|
| DE | 19958674 A1 | * | 6/2001 | ............. F16D 1/116 |
| GB | 336589 A | * | 10/1930 | ......... F16L 37/0885 |
| GB | 944649 A | * | 12/1963 | ............. F16D 1/116 |

OTHER PUBLICATIONS

Wikipedia Contributors. "Hirth Joint" Wikipedia, Wikimedia Foundation, Jun. 27, 2017, https://en.wikipedia.org/wiki/Hirth_joint, accessed Jul. 21, 2020, Internet Archive_web.archive.org/web/201610221494635/https://en.wikipedia.org/wiki/Hirth_joint.

*Primary Examiner* — Josh Skroupa
(74) *Attorney, Agent, or Firm* — McDonnell Boehnen Hulbert & Berghoff LLP

(57) ABSTRACT

Retention mechanisms are used for coupling two objects, such as coupling end-of-arm tooling to a robotic arm system. The retention mechanisms may include two mounting members, each of which may be attached to a respective object to be coupled, such as an end effector and a robotic device appendage. The retention mechanisms may use interlocking alternating fingers on each mounting members to cooperatively form a tapered annular channel into which an external retaining ring or disc spring fits and applies pressure to secure the opposing mounting members in tight proximity to each other.

20 Claims, 8 Drawing Sheets

(56) References Cited

U.S. PATENT DOCUMENTS

| | | | | |
|---|---|---|---|---|
| 3,863,959 | A * | 2/1975 | Blaschke | E21B 17/046 285/24 |
| 4,518,277 | A * | 5/1985 | Bush | B64G 1/641 403/102 |
| 4,836,801 | A * | 6/1989 | Ramirez | H01R 13/2421 439/322 |
| 5,021,001 | A * | 6/1991 | Ramirez | H01R 24/52 439/349 |
| 6,413,008 | B1 * | 7/2002 | van Dest | F16C 33/586 403/364 |
| 6,669,570 | B2 * | 12/2003 | Krude | F16D 1/076 403/364 |
| 8,001,725 | B2 * | 8/2011 | Lhotak | F16D 1/116 403/364 |
| 8,628,267 | B2 * | 1/2014 | Li | F16D 1/116 403/316 |
| 9,016,730 | B2 * | 4/2015 | Cameron | F16B 7/0426 285/330 |
| 9,051,946 | B2 * | 6/2015 | Cameron | F16B 7/0426 |

\* cited by examiner

SECTION A-A

US 11,014,249 B1

CASTLE RETENTION MECHANISM WITH TAPERED ANNULAR CHANNEL

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), enveloping, ingressive (such as a pin or needle), astrictive (such as a vacuum or suction element) or contigutive (requiring contact for adhesion, such as glue).

SUMMARY

The present application discloses implementations of a castle retention mechanism for coupling two objects. The retention mechanisms disclosed have two members, each with fingers similar to castle crenellations that interlock to prevent radial movement. Additionally, a retaining ring, disc spring, or similar radial locking ring is disposed between opposing tapered or parallel annular faces of the fingers and forces the fingers apart axially, thereby urging the two members together. In one embodiment, the retention mechanism is configured to join two components of a robotic arm assembly, such as an end effector to an appendage.

In one example, the present application describes a retention mechanism that includes a first member, a second member, and a retaining ring. The first member includes a first body, and a first plurality of fingers arranged radially about the first body. Each finger of the first plurality may: (i) extend radially from the first body, (ii) extend axially beyond a first end of the first body, and/or (iii) include a first annular contact face oriented at a first acute angle to a plane perpendicular to a longitudinal axis of the retention mechanism. The second member includes a second body and a second plurality of fingers arranged radially about the second body. Each finger of the second plurality may: (i) extend radially from the second body, and (ii) include a second annular contact face oriented at a second acute angle to the plane perpendicular to the longitudinal axis of the retention mechanism. Each finger of the second plurality may be interleaved between each finger of the first plurality. The retaining ring may be located between, and contacting, both the first annular contact faces and the second annular contact faces. The retaining ring may be configured to push the first annular contact faces and the second annular contact faces in opposing directions axially, thereby drawing the first body towards the second body.

In another example, the present application describes a retention mechanism that includes a first member, a second member, and a disc ring. The first member includes a first body, and a first plurality of fingers arranged radially about the first body. Each finger of the first plurality may: (i) extend radially from the first body, (ii) extend axially beyond a first end of the first body, and/or (iii) include a first annular contact face oriented at a first angle to a plane perpendicular to a longitudinal axis of the retention mechanism. The second member includes a second body and a second plurality of fingers arranged radially about the second body. Each finger of the second plurality may: (i) extend radially from the second body, and (ii) include a second annular contact face oriented at a second angle to the plane perpendicular to the longitudinal axis of the retention mechanism. Each finger of the second plurality may be interleaved between each finger of the first plurality. The disc spring may be located between, and contacting, both the first annular contact faces and the second annular contact faces. The retaining ring may be configured to push the first annular contact faces and the second annular contact faces in opposing directions axially, thereby drawing the first body towards the second body.

In another example, the present application describes a robotic end-of-arm retention mechanism that includes a first member, a second member, and a retaining ring. The first member may include: (i) a first body configured to couple with a robotic end effector, and (ii) a first interrupted annular contact wall extending from the first body. The second member may be coupled with the first member and may include: (i) a second body configured to couple with a robotic arm system, and (ii) a second interrupted annular contact wall extending from the second body. The second interrupted annular contact wall may be arranged opposite the first interrupted annular contact wall, thereby forming an annular channel. The retaining ring may be located at least partially in the annular channel and may contact both the first interrupted annular contact wall and second interrupted annular contact wall. The retaining ring may be configured to push the first interrupted annular contact wall and second interrupted annular contact wall in opposing directions axially, thereby drawing the first body towards the second body.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
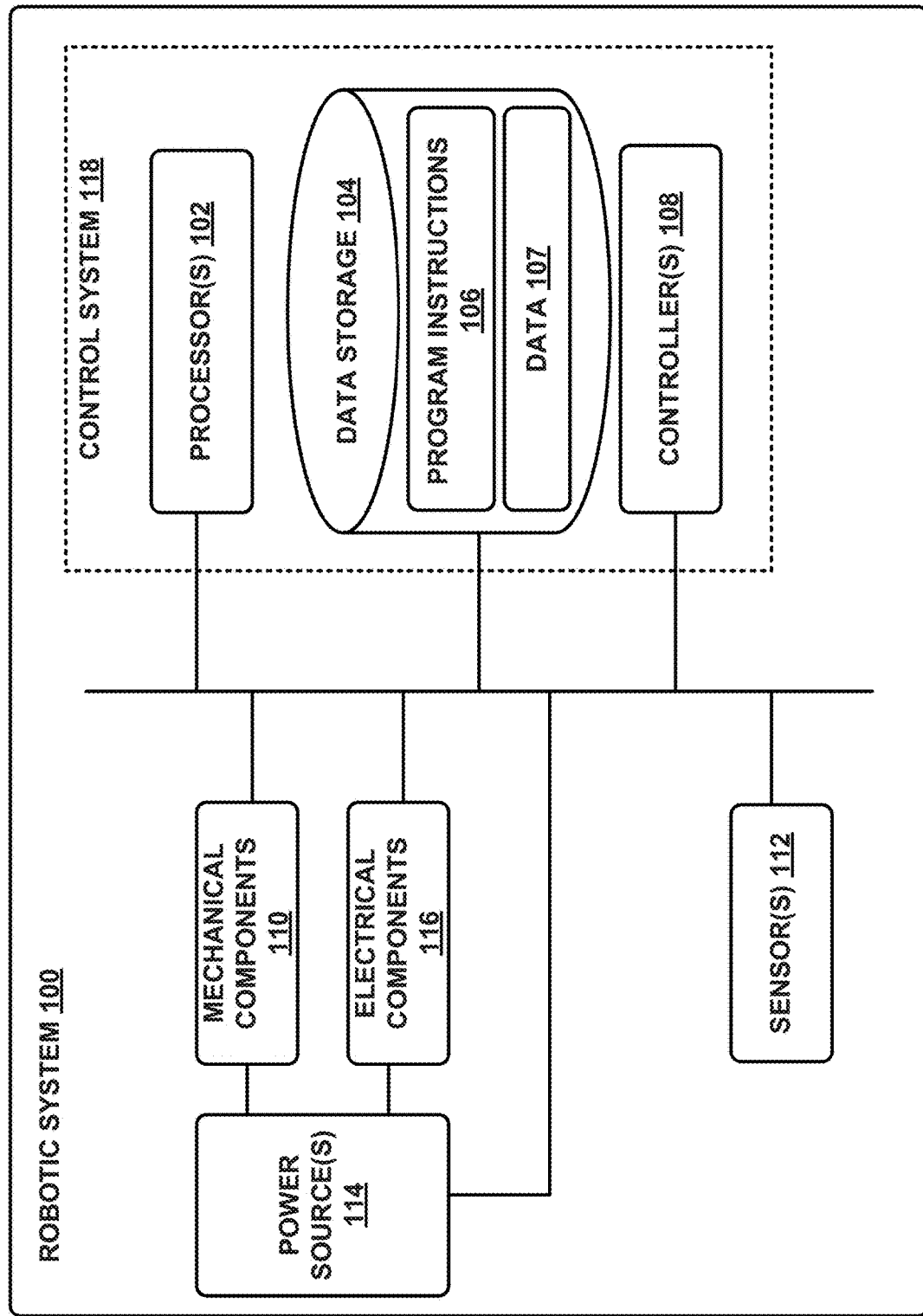
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. OVERVIEW

As explained above, various types of robotic devices are being created for performing a variety of tasks that may assist users. For example, a robotic device may interact with objects while performing an assigned task. The tools that a robotic device may use to interact with objects may be referred to as end-of-arm tooling (EOAT). For example, EOAT may include an "end effector."

Disclosed herein are retention mechanisms for coupling two objects, such as coupling EOAT to a robotic device. The disclosed retention mechanisms may include two mounting members, each of which may be attached to a respective object to be coupled, such as an end effector and a robotic device appendage, respectively. The retention mechanisms may use interlocking alternating fingers on each mounting members to cooperatively form a tapered annular channel into which an external retaining ring (or disc spring) fits and applies pressure to secure the opposing mounting members in tight proximity to each other. The retention mechanisms disclosed herein may have a very short axial length and low weight, thereby allowing compact, efficient robotic system designs. Additionally, the retention mechanisms may include one or more thru-holes which provide a beneficial means of internally routing cabling and/or tubing between objects coupled to the retention mechanism The components of the retention mechanisms may also be injection moldable without mold undercuts, thereby allowing cheaper mold designs. In use, the retention mechanisms may maintain an axial preload between the mounting members, thereby increasing system rigidity. In effect, the retention mechanisms may eliminate slop and backlash during normal use. Additionally, the retention mechanisms may also provide positive radial locating features for consistent coupling.

II. EXAMPLE ROBOTIC SYSTEMS

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

In an example, the data storage 104 may be a remote server (e.g., cloud server) in which the robotic device 100 may store data 107. The robotic device may also retrieve the data 107 from the remote server. The server may include one or more servers, such as one or more of a communications server, an application server, a file server, a database server, and a web server. A server may be referred to as a "computer server." The data transfer between the robotic device 100 and the cloud server may be arranged according to a file transfer protocol (FTP), or according to another protocol.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), digit(s), feet, preshaper components, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. In other implementations, the robotic system 100 may include one or more detachable digits. Other types of removable components may be included within some implementations.

The robotic system 100 may include sensor(s) 112 arranged to sense aspects of the robotic system 100. The sensor(s) 112 may include one or more force sensors, force/torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or digit to measure the load on the actuators that move one or more members of the arm, leg, hand, foot, or digit. As another example, the robotic system 100 may use one or more position sensors to sense the position of the actuators of the robotic system. For instance, such position sensors may sense states of extension, retraction, positioning, or rotation of the actuators on arms, legs, hands, feet, digits, preshaper components, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems (e.g., internal combustion engines, fuel cells, hamster wheels, etc.). As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
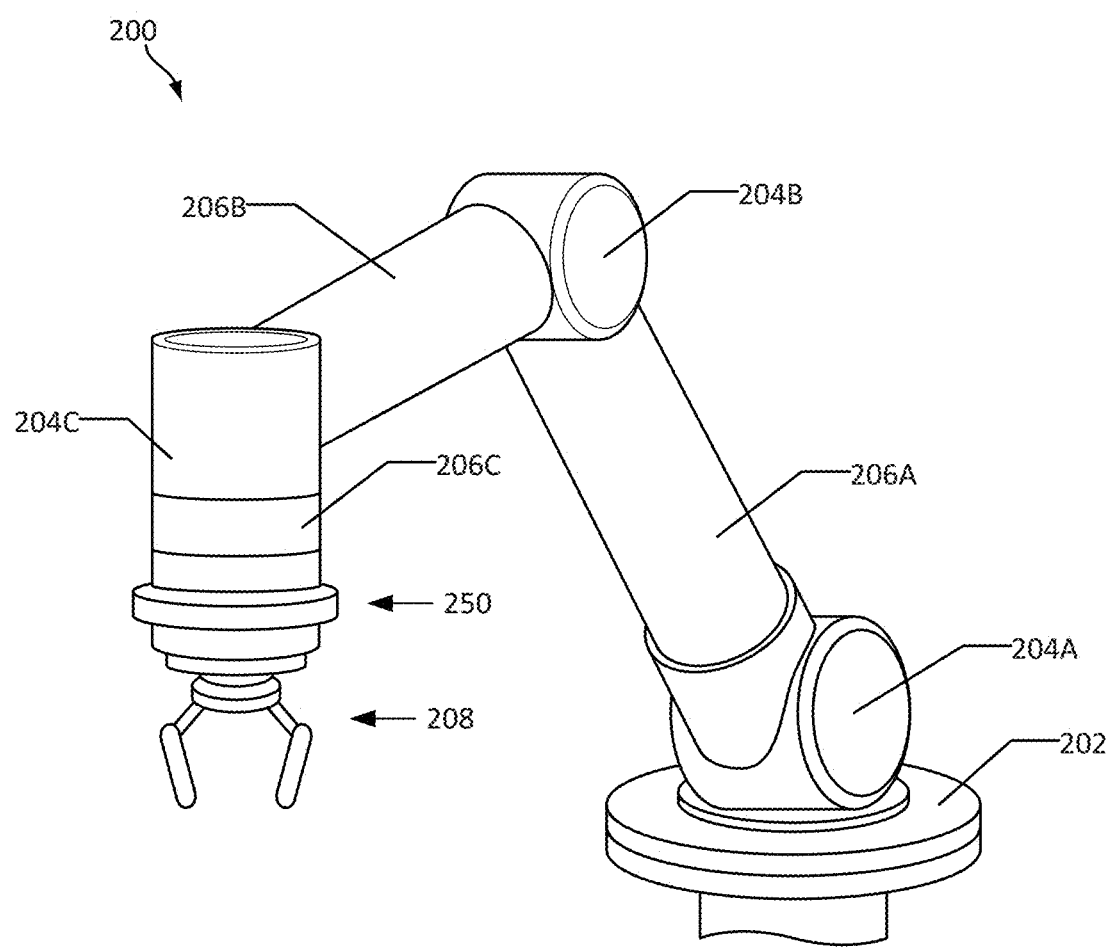
FIG. 2 illustrates an example robotic arm system, according to an example implementation.
Figure 3B:
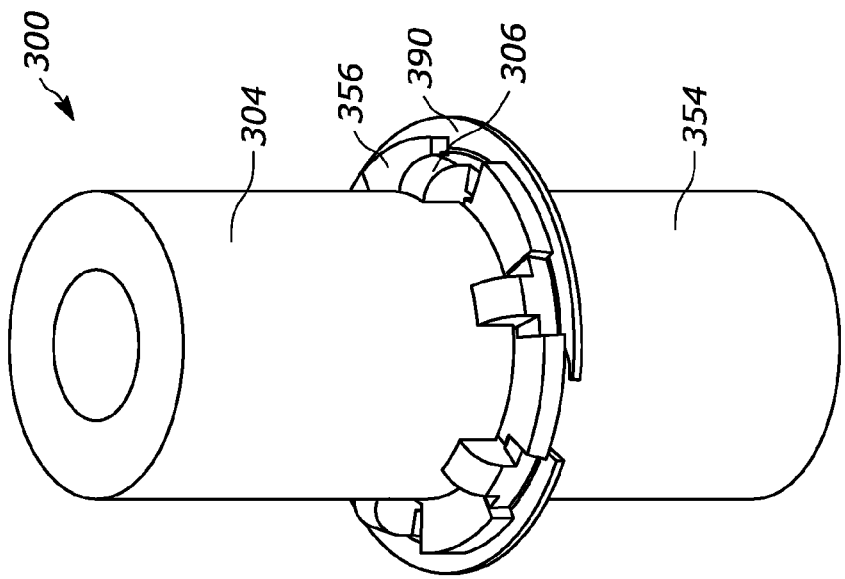
FIG. 3B illustrates a perspective view of an example retention mechanism, according to an example embodiment.
Figure 3A:
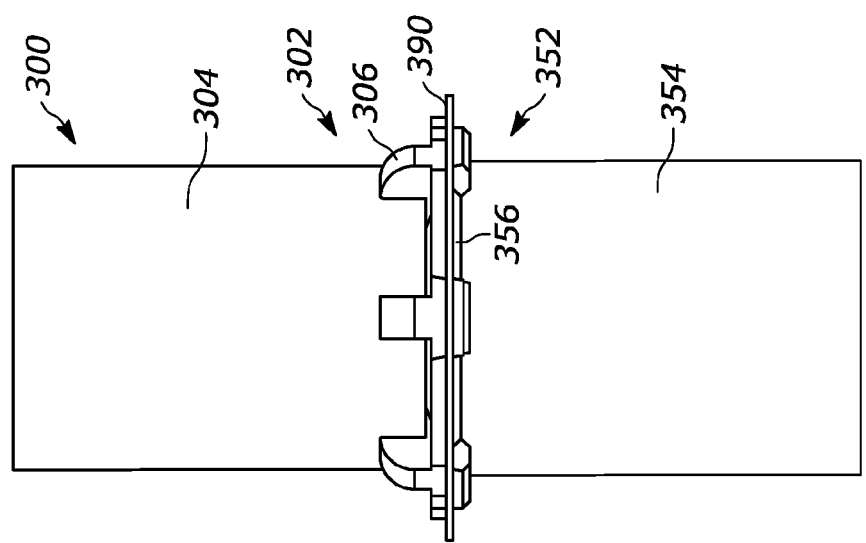
FIG. 3A illustrates a front view of an example retention mechanism, according to an example embodiment.
Figure 3D:
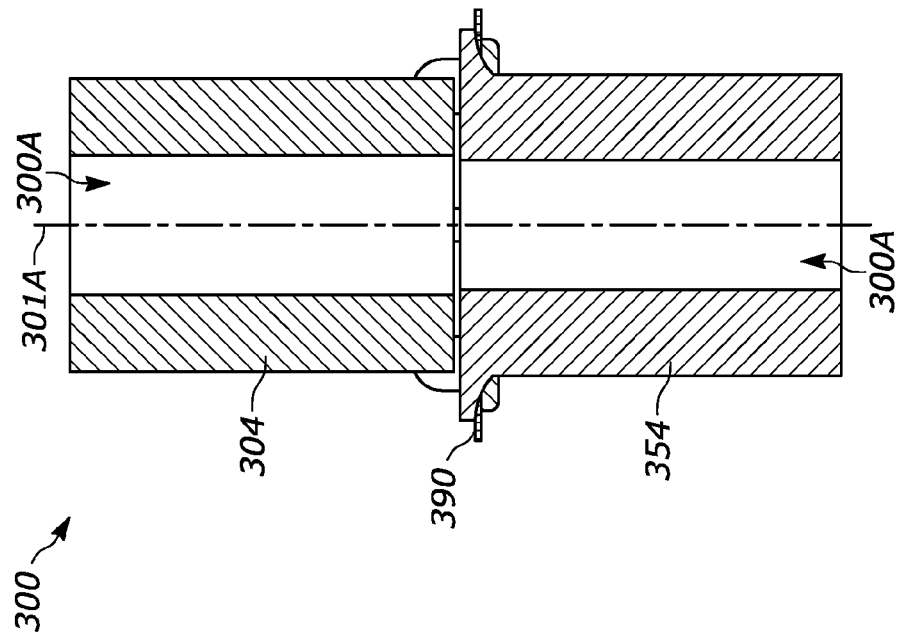
FIG. 3D illustrates a cutaway view of an example retention mechanism, according to an example embodiment.
Figure 3C:
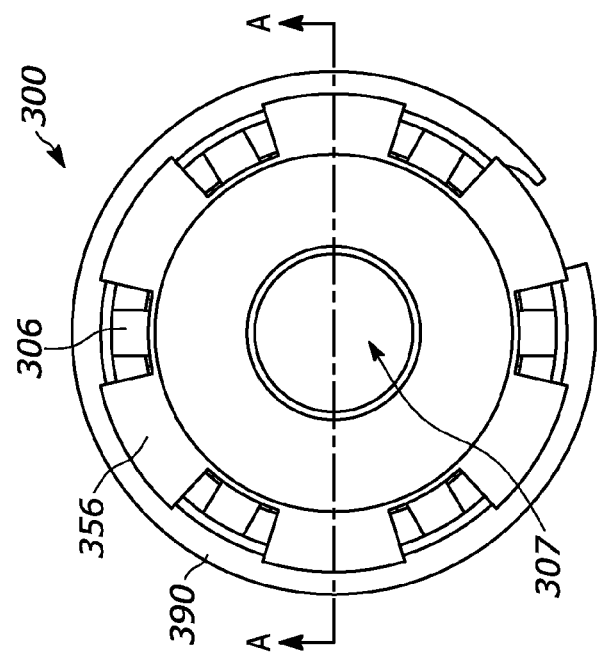
FIG. 3C illustrates a top view of an example retention mechanism, according to an example embodiment.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204C each coupled to one or more actuators. The actuators in joints 204A-204C may operate to cause movement of various mechanical components 110 such as appendages 206A-206C and/or end effector 208 (which may be considered one or more appendages). For example, the actuator in joint 204C may cause movement of appendage 206C and end effector 208 (i.e., since end effector 208 is coupled to appendage 206C). Retention mechanism 250 may couple the end effector 208 to the appendage 206C. Retention mechanisms, such as retention mechanism 250, may additionally or alternatively be located at, within, or between other appendages and/or joints. Retention mechanism 250 is illustrated, for clarity purposes only, as a larger diameter than the surrounding components. In practical use, retention mechanism 250 may be the same size or smaller than the surrounding components, and/or may be incorporated inside another component, such as an appendage or joint. End effector 208 may take on various forms and may include various parts. In one example, end effector 208 may take the form of a gripper such as a digit gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Note that the end effector 208 may be a detachable end effector such that the robotic arm 200 may swap out the end effector 208 with a different end effector. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, force/torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. EXAMPLE RETENTION MECHANISMS

As noted above, the present disclosure includes implementations that relate to castle retention mechanisms. The retention mechanisms may be used in a robotic device and/or system to allow easy appendage and/or EOAT changes.

FIG. 3A-3D illustrate various views of an example retention mechanism 300, according to an example embodiment. Retention mechanism 300 may be used as retention mechanism 250 as shown in FIG. 2, or at other locations in FIG. 2, or for joining other objects together.

A first member 302 serves as a mounting structure for other objects, such as robotic appendage in FIG. 2. First member 302 includes a body 304. Body 304 is illustrated as a simplified representation and may further include additional features, such as mounting features that permit coupling the first member 302 to another object. First member 302 further includes a plurality of fingers 306 arranged radially about the body. (Only one finger 306 is labeled for clarity of illustration.) The fingers 306 extend radially from the body 304 and axially beyond the body 304 at one end.

Second member 352 similar serves as a mounting structure for another object, such as an end effector. Second member 352 also includes a body 354 and, like body 304, body 354 is illustrated as a simplified representation and may further include additional features, such as mounting features that permit coupling the second member 352 to another object. Second member 352 further includes a plurality of fingers 356 arranged radially about the body. (Only one finger 356 is labeled for clarity of illustration.) The fingers 356 extend radially from the body 354. In some embodiments, fingers 356 may extend axially from and/or beyond the body 354 at one end.

The fingers 306 are interleaved with the fingers 356, forming an annular channel between them. (See FIG. 5 for a view of an example annular channel.) As described below, the annular channel may have tapered walls. A retaining ring 390 is at least partially within the annular channel and in contact with the tapered walls, coupling the first member 302 to the second member 352 in the axial direction. The retaining ring 390 is preferably slightly expanded when resident in the annular channel, such that hoop stress in the retaining ring 390 provides a closing force on the retaining 390 ring and against the tapered walls.

Either or both first member 302 and second member 352 may have a thru-hole 300A that extends completely through either the respective member or the retention mechanism 300 as a whole. This provides a beneficial means of internally routing cabling and/or tubing between objects coupled to the retention mechanism 300. Thru-hole 300A is illustrated as located about a longitudinal axis 301A of the retention mechanism, but may alternatively be located elsewhere in the retention mechanism 300, and/or additional thru-holes may also be present.

First member 302 and second member 352 may preferably be made of moldable or machinable material, such as plastic or metal. Retaining ring 390 is preferably a twist-on metal retaining ring, such as the type exemplified by McMaster-Carr® part number 94540A540; however, other types and materials are usable as well, provided they can apply a constant pressure against the side walls of the annular channel.

Figure 4:
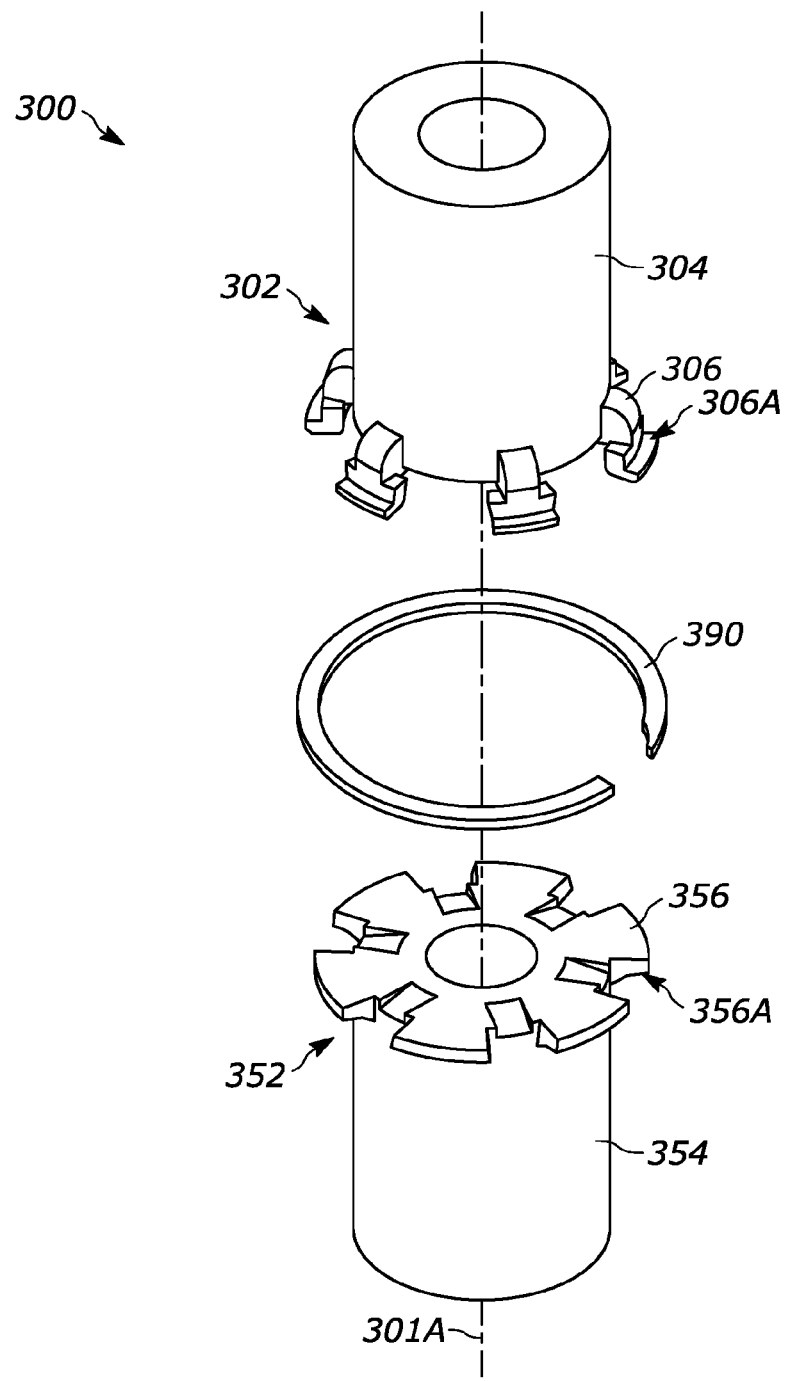
FIG. 4 illustrates an exploded view of an example retention mechanism, according to an example embodiment.

FIG. 4 illustrates an exploded view of example retention mechanism 300, according to an example embodiment. In first member 302, fingers 306 can be seen extending axially beyond an end of the body 304 and also extending radially from the body 304. Similarly, fingers 356 can be seen extending radially from the body 354. In this embodiment, pockets in the second member 352 allow close engagement with first member 302. In some embodiments, fingers 356 may extend axially from and/or beyond an end of second body 354.

Figure 5:
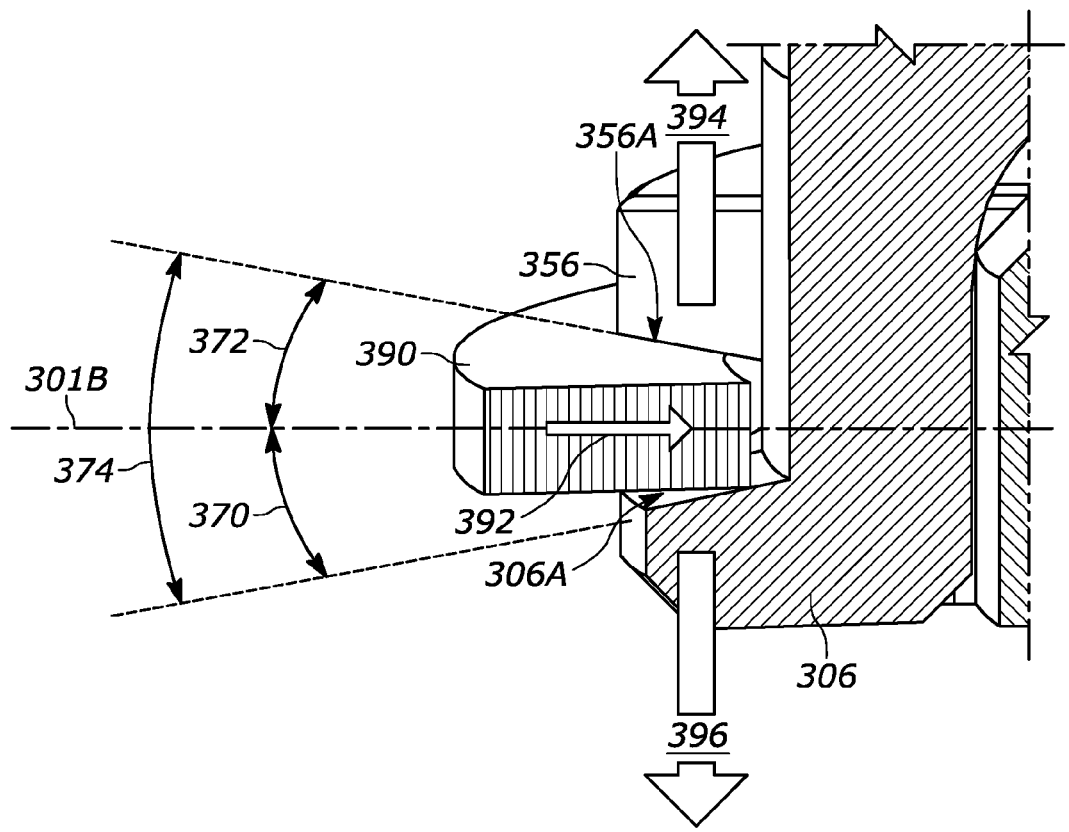
FIG. 5 illustrates a cutaway front detail view of an example retention mechanism, according to an example embodiment.

FIG. 5 illustrates a cutaway front detail view of example retention mechanism 300, according to an example embodiment. The view in FIG. 5 shows an enlarged section of the interface of interleaved fingers 306 and 356, and retaining ring 390. Finger 306 is illustrated in cutaway to highlight the arrangement. Finger 306 includes an annular contact face 306A and finger 356 includes an annular contact face 356A opposing the annular contact face 306A, with the edge of annular contact face 356A labeled for clarity in this view. The annular contact faces 306A and 356A form tapered sides of an annular channel and are in contact with the retaining ring 390. Circumferentially about the first and second members 302 and 352, the plurality of annular contact faces 306A or 356A each form a respective interrupted annular contact wall extending from the respective body 304 or 354, respectively. Annular contact faces 306A and 356A each form an acute angle, 370 and 372 respectively, to a plane 301B perpendicular to the longitudinal axis 301A of the retention mechanism 300. Acute angles 370 and 372 can be combined to define included interface angle 374.

Retaining ring 390 is preferably in slightly expanded form, such that it is continually pressing in radially and applying a force 392 against the tapered annular contact faces 306A and 356A. Because of mechanical advantage against the tapered contact faces 306A and 356A, a force 392 applied radially by the retaining ring 390 applies much larger axial forces 394 and 396 against the fingers 306 and 356, and consequently pushes the annular contact faces 306A and 356A, and therefore the fingers 306 and 356, in opposing directions axially, drawing the body 304 towards the body 354. This effectively couples the first member 302 and the second member 352 in the axial direction and creates a preload between them.

In general, the lower the included interface angle 374, the greater the axial forces 394 and 396, and the greater the preload. Below a certain point, the effectiveness of the mechanical advantage is reduced as the retaining ring 390 slips across the annular contact faces 306A and 356A. In some embodiments, one of the annular contact faces 306A or 356A may be parallel to the plane 301B (i.e., with an acute angle of 0°), as long as the other annular contact face is tapered. Preferably, acute angles 370 and 372 are within a range of about 0° to about 45°, with at least one of the acute angles 370 and 372 having a value greater than about 1°. More preferably, acute angles 370 and 372 are within a range of about 2.5° to about 10°, in order to reduce the possibility of slip by the retaining ring 390. And accordingly, included interface angle 374 is preferably within a range of about 2° to about 90°. More preferably, included interface angle 374 is within a range of about 5° to about 20°.

Figure 6:
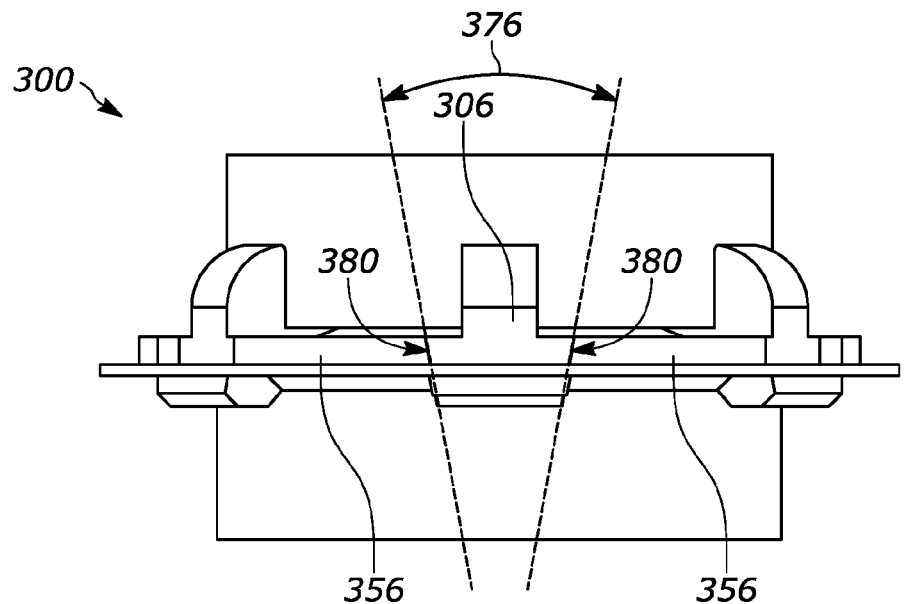
FIG. 6 illustrates a front detail view of an example retention mechanism, according to an example embodiment.
Figure 7:
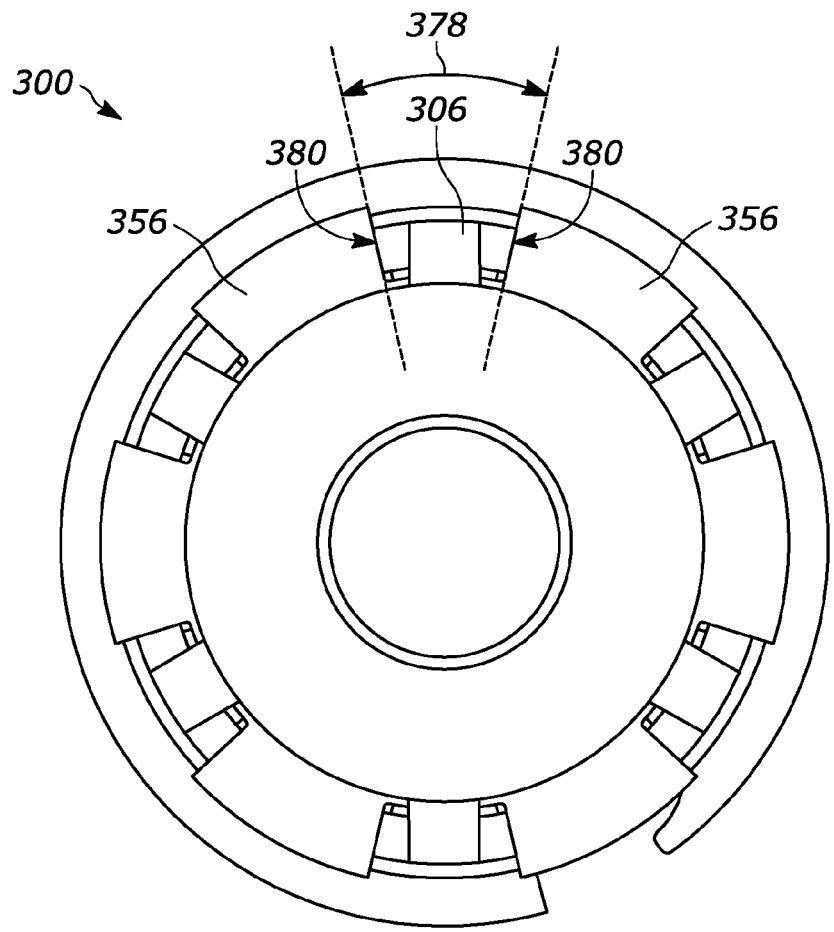
FIG. 7 illustrates a top detail view of an example retention mechanism, according to an example embodiment.

While FIG. 5 illustrates the axial coupling of first member 302 to second member 352, FIGS. 6 and 7 illustrate the corresponding radial coupling between first member 302 and second member 352. As illustrated, each interleaved finger 306 is in contact radially with the adjacent fingers 356 at tapered contact interfaces 380. FIG. 6 illustrates an axial taper angle 376, which is preferably present on both finger 306 and finger 356. As the retaining ring 390 pushes the annular contact faces 306A and 356A apart, the axial taper angle 376 causes the finger 306 to be secured radially between the adjacent fingers 356 along the tapered contact interfaces 380. In a similar fashion, FIG. 7 illustrates a radial taper angle 378, which is preferably present on both finger 306 and finger 356. As the retaining ring 390 applies pressure on the finger 306 towards the longitudinal axis 301A (e.g., by force 392), the radial taper angle 378 causes the finger 306 to be secured radially between the adjacent fingers 356 along the axial contact interfaces 380.

Figure 8:
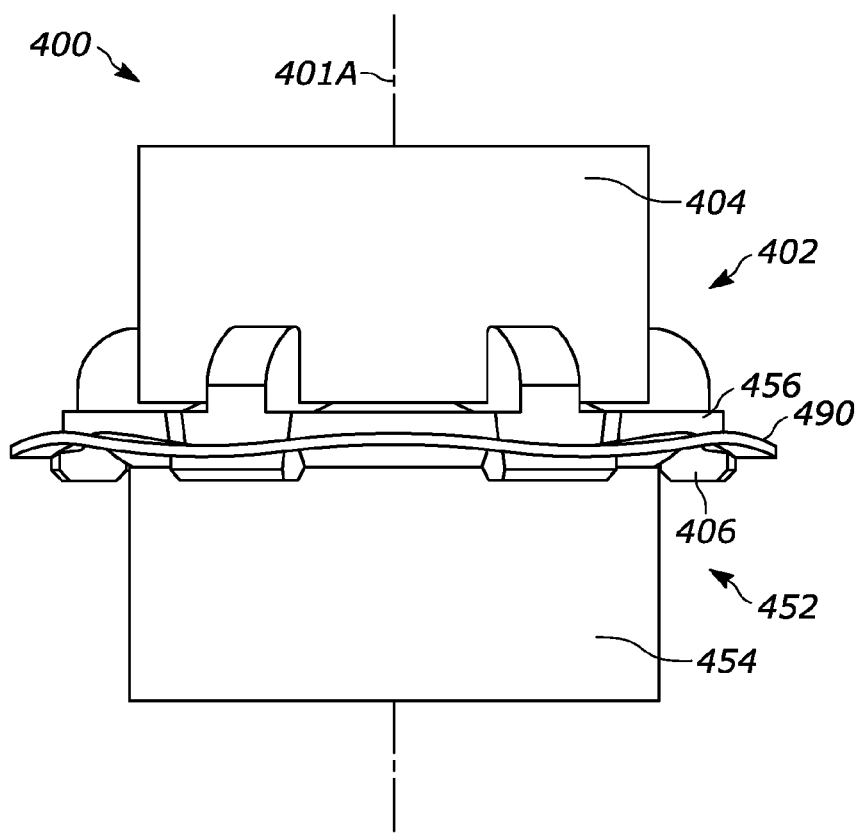
FIG. 8 illustrates a front view of an example retention mechanism, according to an example embodiment.

FIG. 8 illustrates a front view of an example retention mechanism 400, according to an example embodiment. Retention mechanism 400, and components and features therein, may the similar to, or identical to, retention mechanism 300, except as indicated below. Retention mechanism 400 includes a first member 402 and a first member 452, arranged around a central longitudinal axis 401A. As in retention mechanism 300, the plurality of fingers 406 form a first interrupted annular contact wall extending from the body 404 in both a radial direction and axially beyond an end of body 404. Also as in retention mechanism 300, the plurality of fingers 456 form a second interrupted annular contact wall extending from the body 454 in at least a radial direction. In some embodiments, the second interrupted annular contact wall may extend from the body 454 in an axial direction and beyond an end of the body 454. The first and second interrupted annular contact walls form an annular groove, as in retention mechanism 300.

A primary difference between retention mechanism 400 and retention mechanism 300 is the presence of a disc spring 490 instead of a retaining ring 390. Disc spring 490 is preferably a wave disc spring, such as the type exemplified by McMaster-Carr® part number 9714K81. However, other types and materials are usable as well, provided they can apply a constant pressure against the side walls of the annular channel. For example, disc spring 490 may include, but is not limited to, stacks of (or a stacked) wave disc spring(s), Belleville disc springs alone or stacked, and/or finger disc springs alone or stacked. A disc spring 490 will not necessarily apply a radial force, but in some cases a cut disc spring 490 can be inserted in a radially expanded state into the annular groove (as in retention mechanism 300) and it will then exert a radial force as a result of hoop stress. However, it is not always necessary to apply a radial force in the retention mechanism 400. The disc spring 490 will apply an axial force by itself—though it may lack the significant mechanical advantage supplied by the tapered side walls of the annular groove. Accordingly, an included interface angle of the annular groove in the retention mechanism 400 can be about 0° (i.e., the first and second annular contact faces are parallel), but is preferably up to about 20°, and possibly up to 90°.

IV. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A retention mechanism comprising:
   a first member comprising:
      a first body comprising a sidewall having an outer surface facing radially outward, and
      a first plurality of fingers arranged radially about the first body, wherein each finger of the first plurality: (i) extends radially from the outer surface of the first body, (ii) extends axially beyond a first end of the first body, and (iii) comprises a first annular contact face oriented at a first acute angle to a plane perpendicular to a longitudinal axis of the retention mechanism;
   a second member comprising:
      a second body comprising a sidewall having an outer surface facing radially outward, and
      a second plurality of fingers arranged radially about the second body, wherein each finger of the second plurality: (i) extends radially from the outer surface of the second body, and (ii) comprises a second annular contact face oriented at a second acute angle to the plane perpendicular to the longitudinal axis of the retention mechanism, wherein each finger of the second plurality is interleaved between each finger of the first plurality; and
   a retaining ring located between and contacting both the first annular contact faces and the second annular contact faces, wherein the retaining ring is configured to push the first annular contact faces and the second annular contact faces in opposing directions axially, thereby drawing the first body towards the second body.

2. The retention mechanism of claim 1, wherein where each interleaved finger of the second plurality is in radial contact with each adjacent finger of the first plurality.

3. The retention mechanism of claim 2, wherein the radial contact is via a respective tapered contact interface having an axial taper angle.

4. The retention mechanism of claim 2, wherein the radial contact is via a respective tapered contact interface having a radial taper angle.

5. The retention mechanism of claim 1, wherein the first member includes a hollow cavity therethrough.

6. The retention mechanism of claim 1, wherein the first member includes a hollow cavity therethrough and the second member includes a hollow cavity therethrough.

7. The retention mechanism of claim 1, wherein the retention mechanism is configured to couple a robotic end effector to a robotic arm system.

8. The retention mechanism of claim 1, wherein the first acute angle and the second acute angle are the same.

9. The retention mechanism of claim 1, wherein the first acute angle and the second acute angle combined define an included interface angle, wherein the included interface angle is within a range of about 2° to about 90°.

10. The retention mechanism of claim 1, wherein the first acute angle and the second acute angle combined define an included interface angle, wherein the included interface angle is within a range of about 5° to about 20°.

11. A retention mechanism comprising:
    a first member comprising:
       a first body having a cylindrical outer surface, and
       a first plurality of fingers arranged radially about the first body, wherein each finger of the first plurality: (i) extends radially from the cylindrical outer surface of the first body, (ii) extends axially beyond a first end of the first body, and (iii) comprises a first annular contact face oriented at a first angle to a plane perpendicular to a longitudinal axis of the retention mechanism;
    a second member comprising:
       a second body having a cylindrical outer surface, and
       a second plurality of fingers arranged radially about the second body, wherein each finger of the second plurality: (i) extends radially from the cylindrical outer surface of the second body, and (ii) comprises a second annular contact face oriented at a second angle to the plane perpendicular to the longitudinal axis of the retention mechanism, wherein each finger of the second plurality is interleaved between each finger of the first plurality; and
    a disc spring located between and contacting both the first annular contact faces and the second annular contact faces, wherein the disc spring is configured to push the first annular contact faces and the second annular contact faces in opposing directions axially, thereby drawing the first body towards the second body.

12. The retainer mechanism of claim 11, wherein the first annular contact faces are parallel to the second annular contact faces.

13. The retention mechanism of claim 11, wherein the first angle and the second angle combined define an included interface angle, wherein the included interface angle is within a range of about 0° to about 20°.

14. The retention mechanism of claim 11, wherein where each interleaved finger of the second plurality is in radial contact with each adjacent finger of the first plurality.

15. The retention mechanism of claim 14, wherein the radial contact is via a respective tapered contact interface having an axial taper angle.

16. The retention mechanism of claim 14, wherein the radial contact is via a respective tapered contact interface having a radial taper angle.

17. The retention mechanism of claim 11, wherein the first member includes a hollow cavity therethrough.

18. The retention mechanism of claim 11, wherein the first member includes a hollow cavity therethrough and the second member defines a hollow cavity therethrough.

19. A robotic end-of-arm retention mechanism comprising:
    a first member comprising (i) a first body configured to couple with a robotic end effector, and (ii) a first interrupted annular contact wall extending from the first body, wherein the first interrupted annular contact wall includes a first contact face on a first axial end thereof;
    a second member coupled with the first member, wherein the second member comprises (i) a second body configured to couple with a robotic arm system, and (ii) a second interrupted annular contact wall extending from the second body, wherein the second interrupted annular contact wall includes a second contact face on a second axial end thereof, and wherein the second interrupted annular contact wall is arranged opposite the first interrupted annular contact wall, thereby forming an annular channel; and
    a retaining ring located at least partially in the annular channel and contacting both the first interrupted annular contact wall and second interrupted annular contact wall, wherein the retaining ring is configured to push the first interrupted annular contact wall and second interrupted annular contact wall in opposing directions axially, thereby drawing the first body towards the second body.

20. The robotic end-of-arm retention mechanism of claim 19, wherein fingers on each of the first member and the second member are configured to radially couple the first member and the second member together, thereby preventing radial movement of the first member relative to the second member.

\* \* \* \* \*